United States Patent Office 3,415,917
Patented Dec. 10, 1968

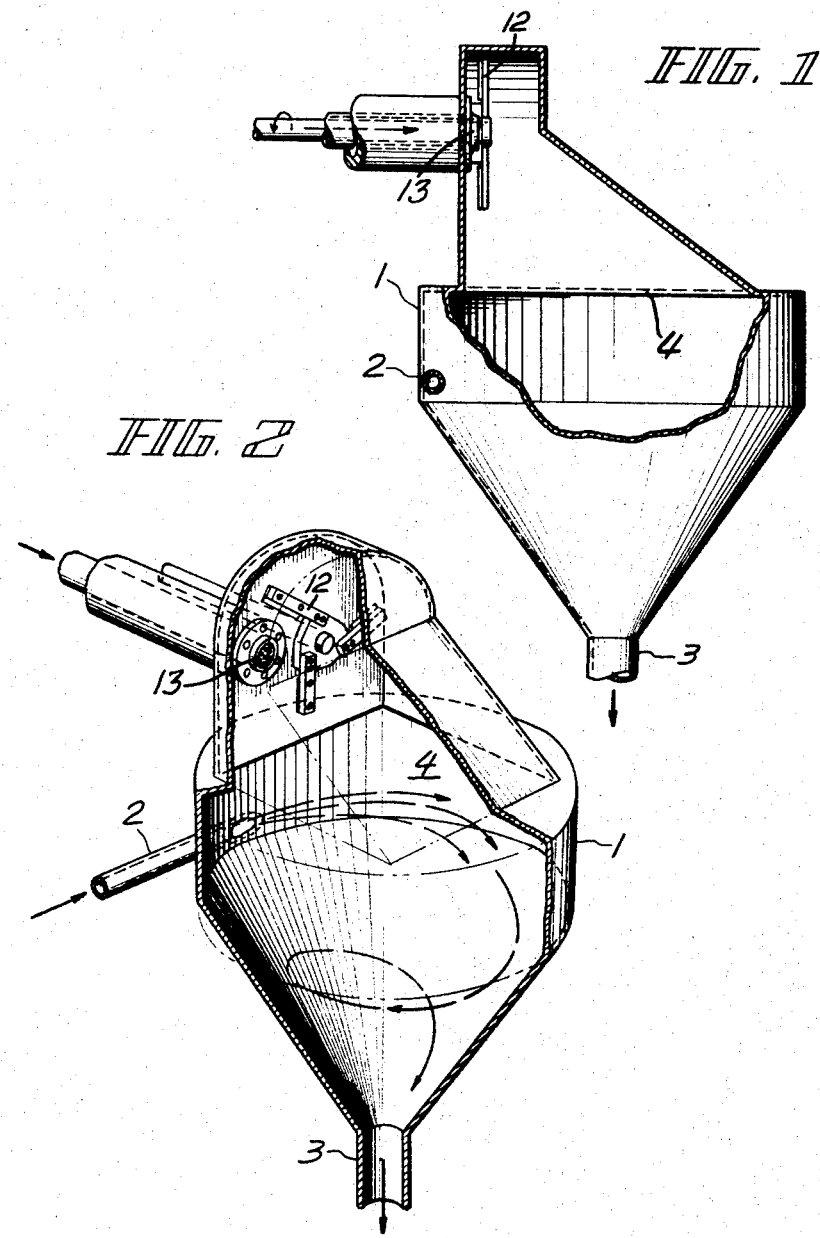

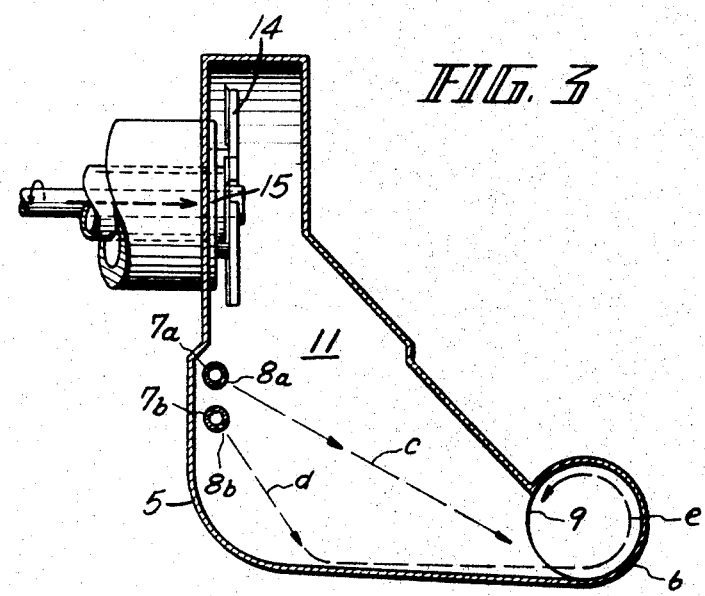
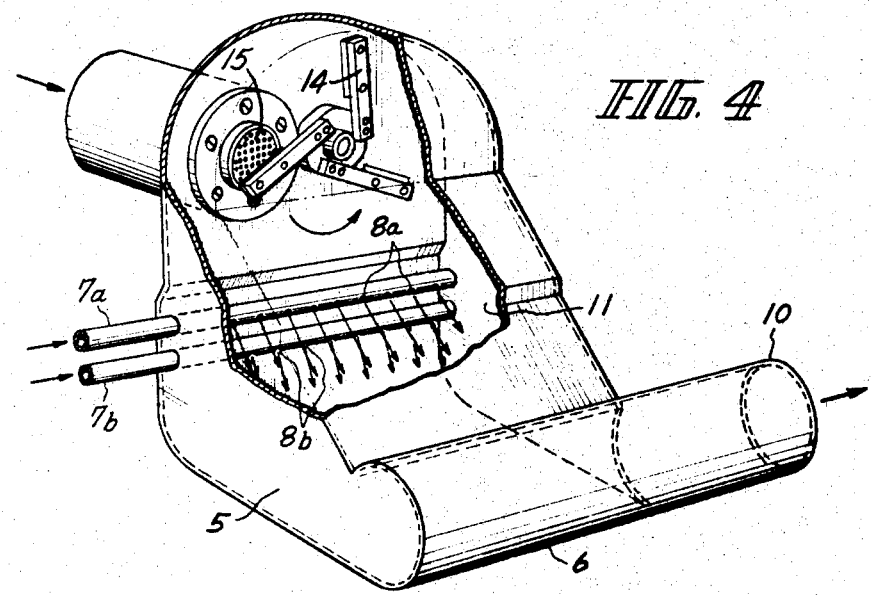

3,415,917
PROCESS FOR FORMING AND COOLING THERMOPLASTIC RESIN PELLETS
Takuro Watanabe and Kazuro Toyama, both of Goi Kaigan, Ichihara-shi, Chiba Prefecture, Japan
Filed June 11, 1965, Ser. No. 463,231
Claims priority, application Japan, June 18, 1964, 39/34,562
7 Claims. (Cl. 264—142)

ABSTRACT OF THE DISCLOSURE

A process for extending and cutting a heated thermoplastic resin to form highly viscous pellets which are then introduced into a whirlstream of cooling water to cool the pellets to a non-sticky state.

---

This invention relates to a method for manufacturing pellets of thermoplastic resin. More particularly, it relates to a method for manufacturing pellets of thermoplastic resin by cooling hot, highly viscous, heat-shaped pellets of a thermoplastic resin for a short time, using a comparatively small amount of a cooling medium, preventing the pellets from sticking to each other or being fused into each other or sticking to the wall of the apparatus; and thus manufacturing them in a uniform shape in a very effective manner.

Thermoplastic resin is produced in various forms, depending upon the method of manufacturing that is employed. For example, it is obtained in the form of an indefinite solid or mass by block polymerization; in globular shapes of various sizes by pearl polymerization; in particles or powder by suspension or emulsion polymerization; or as a solution in an organic solvent by solution polymerization.

The resin in such shapes as mentioned above is inconvenient to handle, and it is in a form which is especially difficult to charge to a molding machine, steadily or quantitatively. Thus, it is generally shaped into a fixed form, for example, in pelleted form for such purpose.

Pellets have been produced by crushing a resin mass into grains of a uniform size. Also, resinous powder has been shaped into the form of a plate, or stamped out into a fixed shape, and then crushed or cut after it has been cooled. However, these methods cannot be operated on a large scale. As an efficient method on a large scale, it is most common to extrude the resin with an extruder into string-shaped material which is then cut into a suitable length. This method is very popular, making it possible to obtain easily the pellets of uniform shape and size. In making pellets with the use of an extruder, there are two known methods: (1) the cold cut method, in which the extruded resin is cut after being cooled and hardened; and (2) the hot cut method in which the resin is cut at the surface of the die or extruder immediately after extrusion without being cooled. The cold cut method is troublesome to operate and requires force for cutting. The hot cut method is employed widely as an efficient method on a large scale since the cutting is easy and the apparatus is simple.

As a special pelletizing method, when a water-insoluble resin is obtained as a solution in an organic solvent and especially when the organic solvent does not mix with water, the solution of the resin is heated while being mechanically agitated and dispersed in water. The solvent is eliminated by evaporation and the resin particles are precipitated in the form of a suspension in water. This is also one of the methods that may be employed for pelletizing thermoplastic resin.

On pelletizing thermoplastic resin by the hot cut method, polyvinyl chloride containing no plasticizer, for example, is hardly viscous at its extruding temperature, so there is no need for cooling it. Thus, after it is cut in air, it may be gathered in a container. This is, however, a rare case. Generally such thermoplastic resins as the polymers of vinyl acetate, methyl acrylate, ethylene and propylene and their copolymers must be cooled to a suitable temperature where their viscosity is reduced or the pellets will be fused to each other or to the wall of the apparatus or container, resulting in a troublesome or inefficient operation.

Various methods have been proposed for cooling pellets in the hot cut method. One method is to throw pellets in a vessel filled or overflowing with a cooling medium. In this case, however, if the resin pellets have a lower specific gravity than the cooling medium, they float on its surface, forming condensed masses which fuse into each other and which will usually fuse to the wall of the container. In order to prevent such fusion, the cooling medium must have a wide free surface. If the resin is of greater specific gravity than the cooling medium, the precipitated pellets, that are not cooled sufficiently, become deposited and fused to each other at the bottom of the cooling vessel.

Another method is very similar to the above-mentioned method, except that an agitator is installed in the cooling vessel. In this case, the effect of cooling the pellets is increased and their cohesion is readily prevented. However, they become fused to the blades of the agitator and to the wall of the cooling vessel. A further method is to extrude a thermoplastic resin directly into a cooling medium, in which it is cut (Japanese patent publication No. S32–439). In this method, the end of the extruder which is heated to a higher temperature must be insulated thermally from the vessel containing a cooling medium of a lower temperature. The temperature of the resin in the die of the extruder is apt to drop, resulting in higher resin viscosity which, in turn, brings about a large power consumption and complication of the apparatus and its operation. In some cases, the pellets may become fused to each other in the cooling medium for the same reason as that of the first method.

A still further method is one in which fused particles of resin that are cut in air are made to fall and strike a slope on which poured water is running and the flow of water changes their direction by 90° and discharges them out of the cutter (Japanese patent publication No. S37–

15,239). This method employs a simple apparatus and can achieve the desired operation to some extent on a small scale. However, the pellets are not cooled sufficiently and the pellets separated from the flowing fluid are apt to become fused to each other. According to experiments carried out by the present inventors concerning the last method, when crystalline polypropylene is extruded at about 200° C. and cut immediately into pellets, the pellets cannot be cooled sufficiently even with the addition of a large quantity of water. When separated from the cooling water by means of a filter, the pellets become fused by more than 10 percent. For preventing the above, it has been found that a very long water course is required for cooling the pellets.

An object of the present invention is to provide a method for pelletizing thermoplastic resin efficiently by the hot cut method.

Another object is to provide a method for manufacturing pellets in a uniform shape.

A further object is to provide a method for cooling pellets efficiently with a comparatively small amount of a cooling medium.

The present invention is a method for pelletizing thermoplastic resins comprising throwing highly viscous, high temperature hot cut pellets of a thermoplastic resin that are cut in air directly into the whirlstream of a cooling medium or throwing them in the stream of a cooling medium and then whirling the stream, thereby causing the pellets to whirl together with the medium until they are cooled and become substantially non-viscous before they are separated from the cooling medium.

Generally, the thermoplastic resin is a very poor heat conductor. When pellets of the thermoplastic resin are cooled by placing them in a cooling medium for a short time, only their surfaces are cooled and lose stickiness, but the interior of the pellets is still at a high temperature. If the pellets in such a state are separated from the cooling medium, heat retained in the inside is conducted to their surfaces and as a result, they become viscous again. If the pellets are solidified only at the surface, but are still viscous in their interior, and contact each other or the surfaces of other solid substances, for example, the wall of a vessel, the pellets become fused to each other when they are stationary, or when they collide against each other or against the wall of a vessel, even if they exist in a liquid at a low temperature at which they are not viscous any longer.

The present invention comprises a method for the production of pellets by the hot cut method which comprises throwing the pellets of a thermoplastic resin immediately after being cut, which pellets are still in a semi-molten or plastic state and very fusible, directly into the whirlstream of a cooling medium or into the straight current of a cooling medium about to be whirled, and whirling the stream together with pellets, so that they may be cooled efficiently and for a comparatively short time, and thus be prevented from becoming fused and cohered to each other.

The following is a description of the method of the present invention in reference to the attached drawings.

Referring to FIGURE 1 there is shown schematically a side elevational view of one type of apparatus according to the present invention. FIGURE 2 is a perspective view of the apparatus of FIGURE 1.

In FIGURES 1 and 2, 1 is a main body of a cylindrical cooling vessel having a funnel-shaped bottom. A cooling medium (for example, water) of a suitable temperature is poured into 1 through a pipe 2 having an inlet which is tangential to the wall of the vessel 1, and designed to produce a whirlstream in the direction of the arrows shown in FIGURE 2. As indicated by the arrows in FIGURE 2, the cooling medium takes the form of a whirlstream and follows a path of at least 360° while passing through the cooling vessel.

The pellets of a thermoplastic resin which have been extruded in string shapes from an extruder 13 and immediately cut in a suitable length with a cutter 12 are thrown into the whirlstream through an opening 4 for pellet feed which is installed at a position higher than the pipe 2 and fall gradually in the vessel 1, while whirling with the cooling medium. The pellets are discharged automatically through a discharge pipe 3 to a metal net (not shown) of a suitable mesh spread over a separator (not shown) are then separated from the cooling medium, which gathers thereafter at the bottom of the separator and is discharged through a drainage pipe (not shown). The cooling medium may be discarded, or recirculated through the pipe 2, as is, or after a part of it has been exchanged with a separate cooling medium so as to be adjusted to a suitable temperature. In this apparatus, the time of contact between the pellets and the cooling medium is controlled by the quantity of the cooling medium and the velocity and height of the whirlstream. If the viscosity of the resin is so low that the temperature of the pellets need not be lowered too much, the whirlstream may be at a relatively low velocity and of a low whirl height. However, if the resin is highly viscous, the cooling medium must be ejected at a relatively high velocity and form a high degree of whirling motion. The discharge pipe 3 may be U-shaped (not shown) or in a vertically straight form.

FIGURE 3 is a side elevational view illustrating another type of apparatus according to the present invention. FIGURE 4 is a perspective view of the apparatus shown in FIGURE 3. In FIGURE 3, the main body of the cooling apparatus 5 has an opening 11 for receiving the pellets at its top and a nearly cylindrical device 6 for whirling the cooling medium. The bottom of unit 5 may be designed so as to be at the same level or sloped toward the whirling device 6. The bottom of unit 5 need not be necessarily flat but may be curved. An adequate number of the ejecting pipes 7a and 7b for the cooling medium are installed opposite whirling device 6. A plurality of jets 8a and 8b each having a suitable diameter are fixed in ejecting pipes 7a and 7b or slits of a suitable breadth are installed in the longitudinal direction of tubes 7a and 7b, through which the cooling medium is ejected toward the lower edge of the opening 9 of the whirling device 6. In this case, the cooling medium is ejected in a straight line from the jets to the lower end of the opening 9 as shown by an arrow mark c in FIGURE 3. However, the cooling medium may also pass along the bottom of the main body 5 as shown by the arrow mark d in FIGURE 3. Further, it may also pass in both directions simultaneously.

The hot pellets of thermoplastic resin which have been extruded from an extruder 15, cut with a cutter 14 and while still in a semi-molten or plastic state are thrown in these currents and swept away thereby toward device 6. The stream comprising the cooling medium accompanied by the pellets enters device 6 through the opening 9, and flows along the wall in a whirling movement in the direction of the arrow mark e. The stream moves whirling together with the pellets to the discharge end 10, and is discharged out of the apparatus. The cooling medium is separated from the cooled pellets in a separator (not shown). After being separated from the pellets, the cooling medium is disposed of or recirculated for use, as is, or after a part of it is exchanged with a new cooling medium. A discharge 10 may be installed at each of the two ends of the whirling device 6, i.e. also on surface 5, or only at one side as shown in FIGURE 4. In either case, the semi-cylindrical portion of the whirling device 6 may be either level or may be sloped slightly so as to go downward at a suitable angle towards a discharge end.

Further, it is advantageous to install the whirling device in such a way that the discharging stream of the cooling medium in this device makes a suitable obtuse angle with the direction of the whirling current in the main body 5. By such arrangement it is possible to cause the pellets to flow smoothly and thus prevent them from being retained in this device.

The diameter and length of the whirling device 6 can be determined easily from the quantity of cooling medium and the residence time required depending upon the properties of the thermoplastic resin being manufactured. It is also easy to determine the velocity of flow of the cooling medium on the basis of the foregoing factors.

The cooling medium supplied through the pipe 6 must be given the necessary energy in advance for it to whirl in the whirling device 6. It is determined from the velocity of flow of the cooling medium which is ejected through the pipe 7a or 7b. The inventors have confirmed experimentally that when water of normal tap temperature is used, the sufficient velocity of water flow is above about 3 meters per second at the opening 9 if the diameter of the whirling device is 300 millimeters, and above 4.5 meters per second if it is 600 millimeters. The flow of the cooling medium being ejected through the pipe 7a or 7b should cover the whole bottom of the main body 5 (not leaving any part of it dry) and need not necessarily be uniform all over the bottom. However, it is desirable that a large quantity of the cooling medium be directed at the main body of the pellets by adjusting the pitch of the ejecting holes or slits. Whatever kind of a cooling device may be employed, it is desirable to flow a suitable quantity of the cooling medium on a part or all of the wall to keep it wet because if the pellets contact the upper part of the wall just after being cut while in a semi-molten state, they will become adhered to the walls as well as each other.

The time of contact between the cooling medium and the pellets may vary more or less according to the kind of the resin, the cutting temperature, the size of the pellets and the kind, temperature and quantity of the cooling medium. However, when polypropylene is cooled with water below 50° C., a time of contact of about 1.5 seconds is sufficient.

Needless to speak of, the method of the present invention can be applied not only to thermoplastic resin itself but also to the manufacture of pellets of any composition which is obtained by mixing a suitable stabilizer, dye, pigment, filler, plasticizer or different thermoplastic resin with it or by their combination.

Example 1

The apparatus illustrated in FIGURE 3 of which the bottom was about 1 meter long and 1.2 meters wide and a whirling device was 30 centimeters in diameter, was employed. Water of about 40° C. was ejected at a rate of 50 cubic meters per hour through many small holes, each about 3 millimeters in diameter, from a pipe 7a or 7b to the lower edge of an opening 9 of the whirling device 6. In this case, the speed of water flow at the entrance of the whirling device was about 6.5 meters per second.

A powder of crystalline polypropylene, about 140,000 in molecular weight, blended with a small quantity of a phenolic type stabilizer was charged at a rate of 800–1,000 kilograms per hour to a hot cutting machine with an extruder having a maximum temperature adjusted to about 220° C. The extruded polypropylene is cut in pellets, each about 3 millimeters in diameter and about 1.5 millimeters long and is thrown immediately into the flowing water of said cooling apparatus. The mean residence time of the pellets in the cooling apparatus was about 2 seconds. Even if the pellets were discharged from the cooling apparatus and separated immediately from water, they did not adhere to each other. After a continuous operation of about 60 hours, it was observed that polypropylene did not adhere at all to the wall of the apparatus.

Hot-cut polypropylene pellets similar to the above, just after being cut, were thrown at a rate of about 800 kilograms per hour into a vessel, about 1.2 meters wide and about 1.5 meters long, containing water of about 50 centimeters in depth to which water at about 30° C. was supplied continuously at a rate of 50 cubic meters per hour. Ten percent of the pellets adhered to each other and three percent adhered to the wall of the vessel.

Example 2

Polystyrene pellets were charged to the same cooling apparatus as that of Example 1, in which water of about 29° C. was ejected at a rate of about 40 cubic meters per hour. The pellets, which were each about 3.2 millimeters in diameter and about 2 millimeters thick, about 85,000 in molecular weight, made with a hot cutting machine, were charged at a rate of about 800 kilograms per hour. The pellets which were separated after contacting with the cooling water for 2 seconds were not adhered to each other. After a continuous operation for about 15 hours, it was observed that polystyrene did not adhere to the wall of the cooling apparatus.

Example 3

A powder of poly(methylmethacrylate) compounded with 0.1 percent by weight of copper phthalocyanin blue was supplied at a rate of about 650 kilograms per hour to the apparatus of Example 1 and made into hot-cut pellets at 215±5° C. The pellets were cooled using water of 35° C. at a rate of about 50 cubic meters per hour. After cooled for about 2 seconds, the pellets did not adhere to each other.

Example 4

The cooling apparatus of FIGURE 1 was employed. Its main body was about 50 centimeters in diameter and its funel shaped part about 1.2 meters high. Cooling water of about 12° C. was supplied at a rate of about 1.1 meters per second from pipe 2 for generating a whirlstream. The solution of amorphous polyropylene in heptane was heated with stirring in water to drive heptane off, producing globular (1.0–3.0 millimeters in diameter) amorphous polypropylene.

Hot water of about 80° C. containing about 5 percent by weight of the globular amorphous polypropylene was introduced at a rate of 1 cubic meter per hour in the upper edge of the whirlstream in the cooling apparatus. The time of contact between the resin and the cooling water was about 5 seconds. Even if separated from the cooling water immediately after being discharged, the globules did not adhere to each other nor to the cooling apparatus.

Example 5

Water at 40° C. was supplied to the cooling apparatus of Example 4 at a rate of about 7 cubic meters per hour, producing a whirlstream. The pellets, about 2 millimeters in diameter, about 1.8 millimeters long and at about 220° C., of crystalline polypropylene, about 150,000 in molecular weight, which had been produced by the hot-cut method, were thrown at a rate of about 100 kilograms per hour in the upper edge of the whirlstream. The pellets separated from the cooling medium immediately after being discharged, and did not adhere to each other nor to the wall of the cooling apparatus during the operation.

What is claimed is:
1. A process of forming and cooling pellets of hot thermoplastic resin comprising:
   (A) extruding and cutting said hot resin into highly viscous pellets,
   (B) forming a whirlstream of a liquid coolant medium following a path of at least 360°, and
   (C) introducing said hot pellets into said coolant whirlstream and allowing said pellets to flow with said whirlstream until said pellets are cooled to a non-sticky state.

2. The process of claim 1 wherein the cooling medium is water.

3. The process of claim 1 wherein the pellets are cooled for a period of about two seconds.

4. The process of claim 1 wherein the thermoplastic resin is polypropylene.

5. A process of forming and cooling pellets of hot thermoplastic resin comprising:
   (A) extruding and cutting said hot resin into highly viscous pellets,
   (B) forming plural streams of a liquid coolant medium directed toward a whirlstream subsequently formed of said liquid coolant, and
   (C) introducing said hot pellets into said coolant streams and allowing said pellets to flow with said streams into said whirlstream wherein said pellets are cooled to a non-sticky state.

6. The process of claim 5 wherein the cooling medium is water.

7. The process of claim 5 wherein the pellets are cooled for a period of about two seconds.

References Cited

UNITED STATES PATENTS

| | | | |
|---|---|---|---|
| 2,539,916 | 1/1951 | Ludington et al. | 18—12 |
| 3,266,085 | 8/1966 | Nacke. | 264—8 |

FOREIGN PATENTS 636,420  3/1962  Italy.

ROBERT F. WHITE, *Primary Examiner.*

J. R. HALL, *Assistant Examiner.*

U.S. Cl. X.R.

18—12